(12) United States Patent
Lee et al.

(10) Patent No.: US 11,931,678 B2
(45) Date of Patent: Mar. 19, 2024

(54) FILTER UNIT AND REFRIGERATOR INCLUDING THE SAME

(71) Applicants: Microfilter CO., LTD, Chungcheongbuk-do (KR); HISENSE RONSHEN (GUANGDONG) REFRIGERATOR CO., LTD., Guangdong (CN)

(72) Inventors: Kyong Su Lee, Hwaseong-si (KR); Pil Kang Hwang, Jincheon-gun (KR); Min Kyu Jung, Gumi-si (KR)

( * ) Notice: Subject to any disclaimer, the term of this patent is extended or adjusted under 35 U.S.C. 154(b) by 49 days.

(21) Appl. No.: 16/835,356

(22) Filed: Mar. 31, 2020

(65) Prior Publication Data

US 2021/0299600 A1    Sep. 30, 2021

(30) Foreign Application Priority Data

Mar. 24, 2020    (KR) .......................... 10-2020-0035767

(51) Int. Cl.
*B01D 35/30* (2006.01)
*B01D 29/96* (2006.01)
(Continued)

(52) U.S. Cl.
CPC ............. *B01D 35/30* (2013.01); *B01D 29/96* (2013.01); *C02F 1/001* (2013.01); *F25D 23/126* (2013.01);
(Continued)

(58) Field of Classification Search
CPC ...... B01D 29/96; B01D 35/30; B01D 35/306; B01D 2201/302; B01D 2201/303;
(Continued)

(56) References Cited

U.S. PATENT DOCUMENTS 7,056,435 B2 * 6/2006 Jenkins ................. F25D 23/126
                                                    210/232
8,844,307 B2 * 9/2014 Krause .................... F25D 11/02
                                                    62/318
(Continued)

FOREIGN PATENT DOCUMENTS

CN          109708401 A      5/2019
EP            3225293 A1    10/2017
(Continued)

OTHER PUBLICATIONS

An Extended Search Report dated Sep. 21, 2020 for European Application No. 20165881.2.

*Primary Examiner* — Benjamin M Kurtz
(74) *Attorney, Agent, or Firm* — Insight Law Group, PLLC; Seung Lee

(57) ABSTRACT

Provided are a filter unit which may easily replace a filter, and a refrigerator including the same.
To this end, a filter unit according to the present disclosure includes a filter which purifies water, a filter head which is disposed on one end portion of the filter, and includes an inlet port which supplies raw water to the filter and is formed to protrude from one side thereof, and an outlet port which discharges pure water purified by the filter and is formed to protrude from the other side thereof, a filter housing which is formed with a filter accommodation space in which the filter is accommodated, a filter bracket which is coupled to the filter housing, and includes an inlet port coupling part to which the inlet port is coupled rotatably, and an outlet portion coupling part to which the outlet port is coupled rotatably, and a filter door which is coupled to the filter housing to open and close the filter accommodation space.

18 Claims, 15 Drawing Sheets

(51) Int. Cl.
*C02F 1/00* (2023.01)
*F25D 23/12* (2006.01)

(52) U.S. Cl.
CPC ............... *B01D 2201/302* (2013.01); *B01D 2201/4007* (2013.01); *B01D 2201/4023* (2013.01); *B01D 2201/4061* (2013.01); *C02F 2201/004* (2013.01); *C02F 2307/12* (2013.01); *F25D 2323/121* (2013.01)

(58) Field of Classification Search
CPC ...... B01D 2201/306; B01D 2201/4007; B01D 2201/4023; B01D 2201/4061; F25D 2323/121
See application file for complete search history.

(56) References Cited

U.S. PATENT DOCUMENTS

| | | | | |
|---|---|---|---|---|
| 2006/0254971 | A1* | 11/2006 | Tubby | B01D 35/153 |
| | | | | 210/235 |
| 2016/0136547 | A1* | 5/2016 | Nuss | B01D 35/1435 |
| | | | | 210/91 |
| 2017/0274304 | A1* | 9/2017 | You | B01D 35/306 |
| 2020/0047095 | A1 | 2/2020 | Wei | |
| 2021/0108853 | A1* | 4/2021 | Mercer | F25D 23/126 |

FOREIGN PATENT DOCUMENTS

| KR | 20-2011-0001021 | A1 | 1/2011 |
|---|---|---|---|
| KR | 2011-0001021 | U | 1/2011 |

* cited by examiner (a)

(b)

(c)

(d)

(e)

FILTER UNIT AND REFRIGERATOR INCLUDING THE SAME

CROSS-REFERENCE TO RELATED APPLICATION

This application claims priority to Korean Patent Application No. 10-2020-0035767, filed on Mar. 24, 2020, the disclosure of which is incorporated herein by reference in its entirety.

BACKGROUND OF THE DISCLOSURE

Field of the Disclosure

The present disclosure relates to a filter unit and a refrigerator including the same, and more particularly, to a filter unit in which a filter to purify water is installed within a case, and a refrigerator including the same.

Description of Related Art

Generally, a water purifier serves to purify tap water to provide high-quality drinking water to a user, and includes at least one filter configured to remove microorganisms, minerals, or odors from the tap water.

The filter is needed to be replaced periodically because the filter gradually loses the function thereof as it purifies the tap water. Accordingly, a structure for allowing the user to easily replace the filter is required.

Korean Utility Model Application Publication No. 20-2011-0001021 (published on Jan. 31, 2011) (hereinafter, referred to as 'related art') discloses 'Water Purification Coupling Structure for Water Purification System'.

In the related art, an inlet and an outlet are formed in the form of a projection on a cap fastened to the filter, and the inlet and the outlet are rotatably fastened to a pair of holders, such that the user rotates the cap so that the inlet and the outlet are rotated around the pair of the holders, thereby easily replacing the filter.

Meanwhile, recently, a refrigerator having a water purifier function is also released, and a filter for the water purifier function is also installed in such a refrigerator.

Accordingly, if the filter is installed in the same filter case as the case of the home appliance such as the water purifier or the refrigerator, and the filter case is easily coupled to the case of the home appliance, the filter may be easily installed in the home appliance. Even in this case, however, the filter is needed to be easily replaced.

RELATED ART DOCUMENT

Patent Document (Patent Document 1) Korean Utility Model Application Publication No. 20-2011-0001021 (published date: Jan. 31, 2011)

SUMMARY OF THE DISCLOSURE

A first object of the present disclosure is to provide a filter unit, which may easily replace a filter, and a refrigerator including the same.

A second object of the present disclosure is to provide a filter unit, which may prevent the assembly locations of an inlet port and an outlet port from being interchanged with each other, and a refrigerator including the same.

A third object of the present disclosure is to provide a filter unit, which may firmly couple an inlet tube and an outlet tube to a filter housing, and a refrigerator including the same.

A fourth object of the present disclosure is to provide a filter unit, which may facilitate the opening and closing operation of a filter door and prevent the bending of the filter door, and a refrigerator including the same.

The objects of the present disclosure are not limited to the aforementioned objects, and other objects which are not mentioned may be clearly understood by those skilled in the art to which the present disclosure pertains from the following description.

For achieving the objects, a filter unit according to the present disclosure is composed of a filter, a filter head, a filter housing, a filter bracket, and a filter door. The filter purifies water. The filter head is disposed on one end portion of the filter. The filter head is formed with an inlet port and an outlet port. The inlet port is formed to protrude from one side of the filter head. The outlet port is formed to protrude from the other side of the filter head. The inlet port supplies raw water to the filter. The outlet port discharges pure water purified by the filter. The filter housing is formed with a filter accommodation space. The filter is accommodated in the filter accommodation space. The filter bracket is coupled to the filter housing. The filter bracket is formed with an inlet port coupling part and an outlet port coupling part. The inlet port is coupled rotatably to the inlet port coupling part. The outlet port is coupled rotatably to the outlet port coupling part. The filter door is coupled to the filter housing to open and close the filter accommodation space.

The filter bracket may be further formed with a filter coupling part. The filter may be detachably coupled to the filter coupling part.

The filter coupling part may be formed to have an opened one side.

The inlet port coupling part and the outlet port coupling part may be formed to have opened one side.

The outer circumferential surface of one of the inlet port and the outlet port may be formed with a rotation location regulating projection. One of the inlet port coupling part and the outlet port coupling part may be formed with a hole or a groove. The hole or the groove may regulate the rotation location of the rotation location regulating projection when the filter is coupled to the filter coupling part. In addition, the hole or the groove may be formed in only one of the inlet port coupling part and the outlet port coupling part, thereby also preventing the assembly locations between the inlet port and the outlet port from being interchanged with each other.

The filter head may be composed of a filter head main body and a filter head bracket. The filter head main body may be formed with the inlet port and the outlet port. The filter head bracket may be formed in a ring shape. The filter head bracket may couple the filter head main body to one end of the filter. The inner circumferential surface of the filter head bracket may be formed with a first spiral projection, and a second spiral projection. The first spiral projection and the second spiral projection may be formed separately from each other. The outer circumferential surface of one end of the filter may be formed with a first coupling projection and a second coupling projection. The first coupling projection may be engaged with the first spiral projection. The second coupling projection may be engaged with the second spiral projection. Of course, the first coupling projection may also be engaged with the second spiral projection, and the second coupling projection may also be engaged with the first spiral projection.

A first coupling groove and a second coupling groove may be formed within the filter head bracket. The first coupling groove may be a space between the first spiral projection and the filter head main body. The second coupling groove may be a space between the second spiral projection and the filter head main body. The first coupling projection may be coupled to the first coupling groove. The second coupling projection may be coupled to the second coupling groove. Of course, the first coupling projection may also be coupled to the second coupling groove, and the second coupling projection may also be coupled to the first coupling groove.

The inside of the filter housing may be formed with a plurality of first fastening bosses. The inside of the filter bracket may be formed with a plurality of second fastening bosses. The plurality of second fastening bosses may be each fastened to the plurality of first fastening bosses through screws. The inside of the filter housing may be further formed with a first fastening boss alignment guider. The inside of the filter bracket may be further formed with a second fastening boss alignment guider. The second fastening boss alignment guider may be coupled to the first fastening boss alignment guider to align the plurality of first fastening bosses and the plurality of second fastening bosses with fastening locations.

The filter unit according to the present disclosure may further include an inlet tube and an outlet tube. The raw water may be moved in the inlet tube. The pure water may be moved in the outlet tube. The filter housing may be formed with an inlet tube coupling part and an outlet tube coupling part. The inlet tube coupling part may be coupled with the inlet tube. The outlet tube coupling part may be coupled with the outlet tube. The inlet tube coupling part and the outlet tube coupling part may be formed to have opened insides opposite to each other. The filter housing may be formed with a tube anti-separation projection. The tube anti-separation projection may prevent the inlet tube and the outlet tube from being separated. Both sides of the tube anti-separation projection may be located outward from the inside of the inlet tube coupling part and the inside of the outlet tube coupling part.

The tube anti-separation projection may be disposed between the inlet tube coupling part and the outlet tube coupling part, and the filter head.

The filter housing may be formed with a support part. The support part may be formed on a portion corresponding to the rear end of the filter door. The support part may support the rear end of the filter door in a state where the filter is closed.

The inside of the filter door may be formed with a first fixing projection. The filter housing may be formed with a second fixing projection and a slit. The first fixing projection may pass over the second fixing projection when the filter door is slid. The second fixing projection may fix the first fixing projection to the closed location of the filter door. The slit may provide an elastic force to the second fixing projection.

The inside of the filter door may be formed with a first guide projection. The filter housing may be formed with a second guide projection. The second guide projection may be formed with a first guide part and an inclined surface. The first guide part may guide the first guide projection when the filter door is slid. The inclined surface may guide the first guide projection to the first guide part when the filter door is rotated to be closed.

The inside of the filter door may be further formed with a third guide projection. The filter housing may be further formed with a fourth guide projection. The fourth guide projection may be formed with a second guide part. The second guide part may guide the third guide projection when the filter door is slid.

The filter housing may be composed of a front part and a rear part. The lower plate of the rear part may be disposed at a location lower than the front part. The front part may be formed with the filter accommodation space. The front part may be further formed with an opening. The opening may extend rearward from the filter accommodation space. The filter door may be disposed below the front part. The filter door may cover the filter accommodation space and the opening. The filter bracket may be disposed above the front part and the rear part. The filter bracket may cover the rear end portion of the opening.

A first sliding mount may be formed to protrude from the outside of the filter housing. Both sides of the first sliding mount may be formed with first sliding grooves which are coupled to a home appliance. A second sliding mount may be formed to protrude from the outside of the filter bracket. Both sides of the second sliding mount may be formed with second sliding grooves which are coupled to the home appliance.

The filter housing may be further formed with a screw hole fastened to the home appliance through a screw.

A refrigerator according to the present disclosure is composed of a first compartment, a second compartment, and a filter unit. The filter unit may be located on the side upper portion inside the first compartment or the second compartment. The filter unit is composed of a filter head, a filter housing, a filter bracket, and a filter door. The filter head is disposed on one end portion of the filter. The filter head is formed with an inlet port and an outlet port. The inlet port is formed to protrude from one side of the filter head. The outlet port is formed to protrude from the other side of the filter head. The inlet port supplies raw water to the filter. The outlet port discharges pure water purified by the filter. The filter housing is formed with a filter accommodation space. The filter is accommodated in the filter accommodation space. The filter bracket is coupled to the filter housing. The filter bracket is formed with an inlet port coupling part and an outlet port coupling part. The inlet port is coupled rotatably to the inlet port coupling part. The outlet port is coupled rotatably to the outlet port coupling part. The filter door is coupled to the filter housing to open and close the filter accommodation space.

Specific contents of other embodiments are included in the detailed description and the drawings.

In the filter unit and the refrigerator including the same according to the present disclosure, since the filter head which is disposed at one end of the filter is rotatably coupled to the filter bracket, and has the filter door which opens and closes the filter accommodation space formed in the filter housing, it is possible that a user can easily replace the filter by rotating the filter to the location at which the user easily grips the filter after opening the filter door.

In addition, since the rotation location regulating projection is formed on the outer circumferential surface of one of the inlet port and the outlet port which are formed on the filter head, and one of the inlet port coupling part and the outlet port coupling part which are formed on the filter bracket is formed with a hole or a groove which regulates the rotation location of the rotation location regulating projection when the filter is coupled to the filter coupling part, it is also possible to prevent the assembly locations of the inlet port and the outlet port from being interchanged with each other.

In addition, since the inlet tube coupling part and the outlet tube coupling part which are formed in the filter housing are formed to have opened insides opposite to each other, and both sides of the tube anti-separation projection which is formed in the filter housing are located outward from the inside of the inlet tube coupling part and the inside of the outlet tube coupling part, the inlet tube may not be easily separated from the inlet tube coupling part and the outlet tube may not be easily separated from the outlet tube coupling part, thereby firmly coupling the inlet tube and the outlet tube to the filter housing.

The effects of the present disclosure are not limited to the aforementioned effects, and other effects not mentioned will be clearly understood by those skilled in the art from the description of the claims.

DESCRIPTION OF SPECIFIC EMBODIMENTS

Hereinafter, a filter unit and a refrigerator including the same according to an embodiment of the present disclosure will be described with reference to the drawings.

Figure 1:
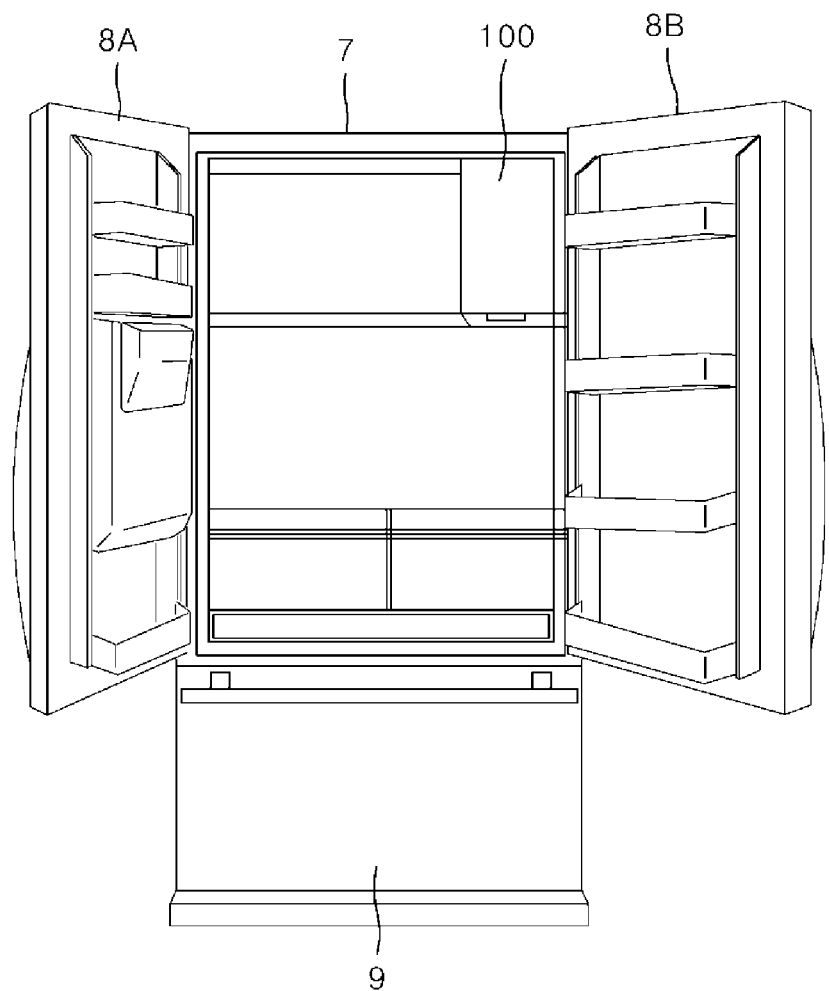
FIG. 1 is a diagram of a refrigerator in which a filter unit is installed according to an embodiment of the present disclosure.

FIG. 1 is a diagram illustrating a refrigerator in which a filter unit is installed according to an embodiment of the present disclosure.

Referring to FIG. 1, a refrigerator in which a filter unit 100 according to an embodiment of the present disclosure is installed may include a main body 7 in which a refrigerating compartment and a freezing compartment are formed, and doors 8A, 8B, 9 which open and close the opened front of the main body 7.

The main body 7 may be formed in a square shape having an opened front surface. The opened front surface of the main body 7 may be the opened front surfaces of the refrigerating compartment and the freezing compartment.

The refrigerating compartment may be disposed above the freezing compartment. However, the refrigerating compartment may also be disposed below the freezing compartment.

The doors 8A, 8B, 9 may include refrigerating compartment doors 8A, 8B which open and close the refrigerating compartment and a freezing compartment door 9 which opens and closes the freezing compartment. The refrigerating compartment doors 8A, 8B may be disposed above the freezing compartment door 9. However, when the refrigerating compartment is disposed below the freezing compartment, the refrigerating compartment doors 8A, 8B may also be disposed below the freezing compartment door 9.

Two refrigerating compartment doors 8A, 8B may be provided. That is, the refrigerating compartment doors 8A, 8B may include a first refrigerating compartment door 8A which opens and closes a part of the refrigerating compartment, and a second refrigerating compartment door 8B which opens and closes the rest of the refrigerating compartment. The first refrigerating compartment door 8A may be rotated around the left to open and close the left portion of the refrigerating compartment, and the second refrigerating compartment door 8B may be rotated around the right to open and close the right portion of the refrigerating compartment. When the refrigerator is viewed from the front, the first refrigerating compartment door 8A may be disposed at the left of the second refrigerating compartment door 8B, and the second refrigerating compartment door 8B is disposed at the right of the first refrigerating compartment door 8A.

One freezing compartment door 9 may be provided. The freezing compartment door 9 may be slid back and forth to be opened and closed.

The filter unit 100 may be installed to the upper right side within the refrigerating compartment. However, the filter unit 100 may also be installed to the upper left side within the refrigerating compartment, may also be installed to the upper right side within the freezing compartment, and may also be installed to the upper left side within the freezing compartment.

Of course, the refrigerator may also be formed as a freezer having only the freezing compartment without the refrigerating compartment, and may also be formed as a refrigerator having only the refrigerating compartment without the freezing compartment.

In addition, one refrigerating compartment door 8A, 8B may be provided instead of two, and two freezing compartment doors 9 may be provided instead of one.

That is, although the refrigerator according to an embodiment of the present disclosure has been described as, for example, a French Door Refrigerator (FDR) type refrigerator which includes the refrigerating compartment which is formed in the upper portion thereof, the freezing compartment which is formed in the lower portion thereof, the two doors 8A, 8B which are provided on the refrigerating compartment and rotated to both sides to be opened and closed, and the door 9 which is provided on the freezing compartment and slid back and forth to be opened and closed in a drawer type, the present disclosure is not limited to the FDR type refrigerator, and may also include a Side By Side (SBS) type refrigerator in which two doors are opened to two sides.

When any one of the refrigerating compartment and the freezing compartment is defined as a first compartment and the other is defined as a second compartment, the filter unit 100 may be installed to the upper side within the first compartment or the second compartment.

Figure 2:
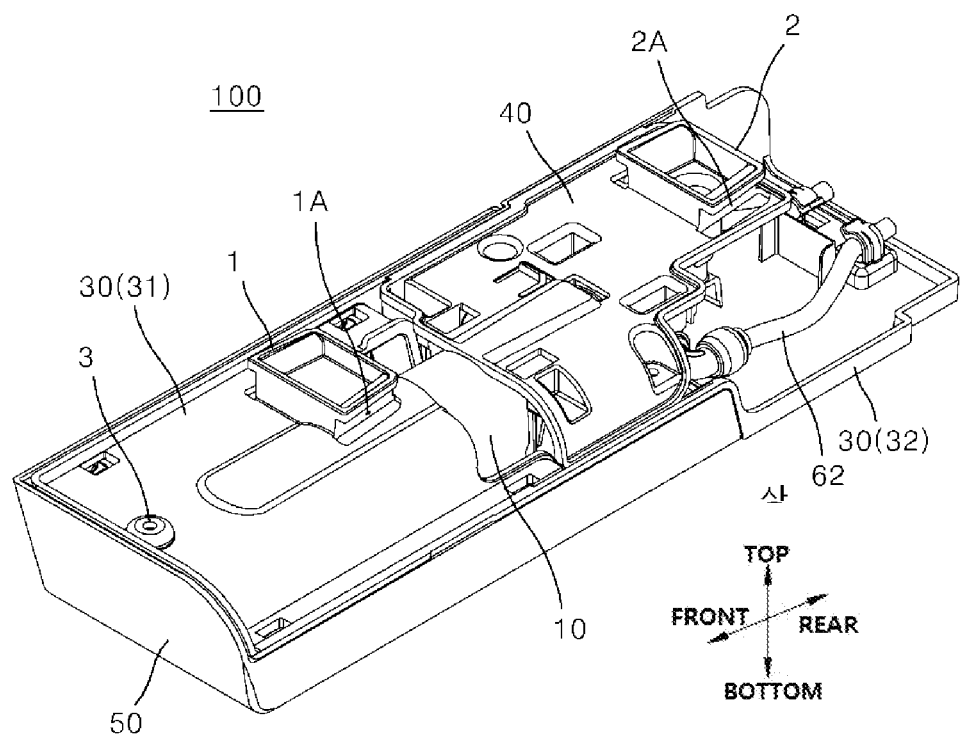
FIG. 2 is a front side coupling perspective diagram illustrating the filter unit according to an embodiment of the present disclosure.
Figure 3:
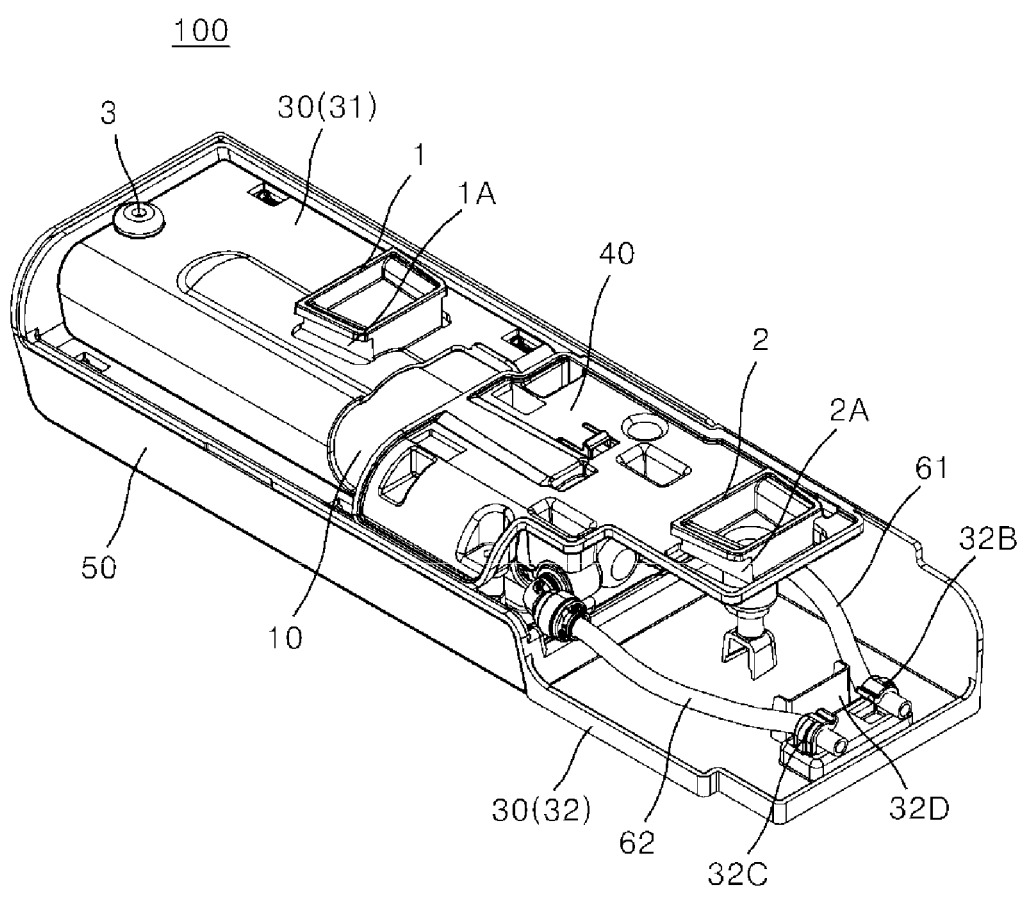
FIG. 3 is a rear side coupling perspective diagram illustrating the filter unit according to an embodiment of the present disclosure.
Figure 3:
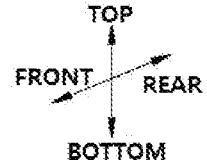
Figure 4:
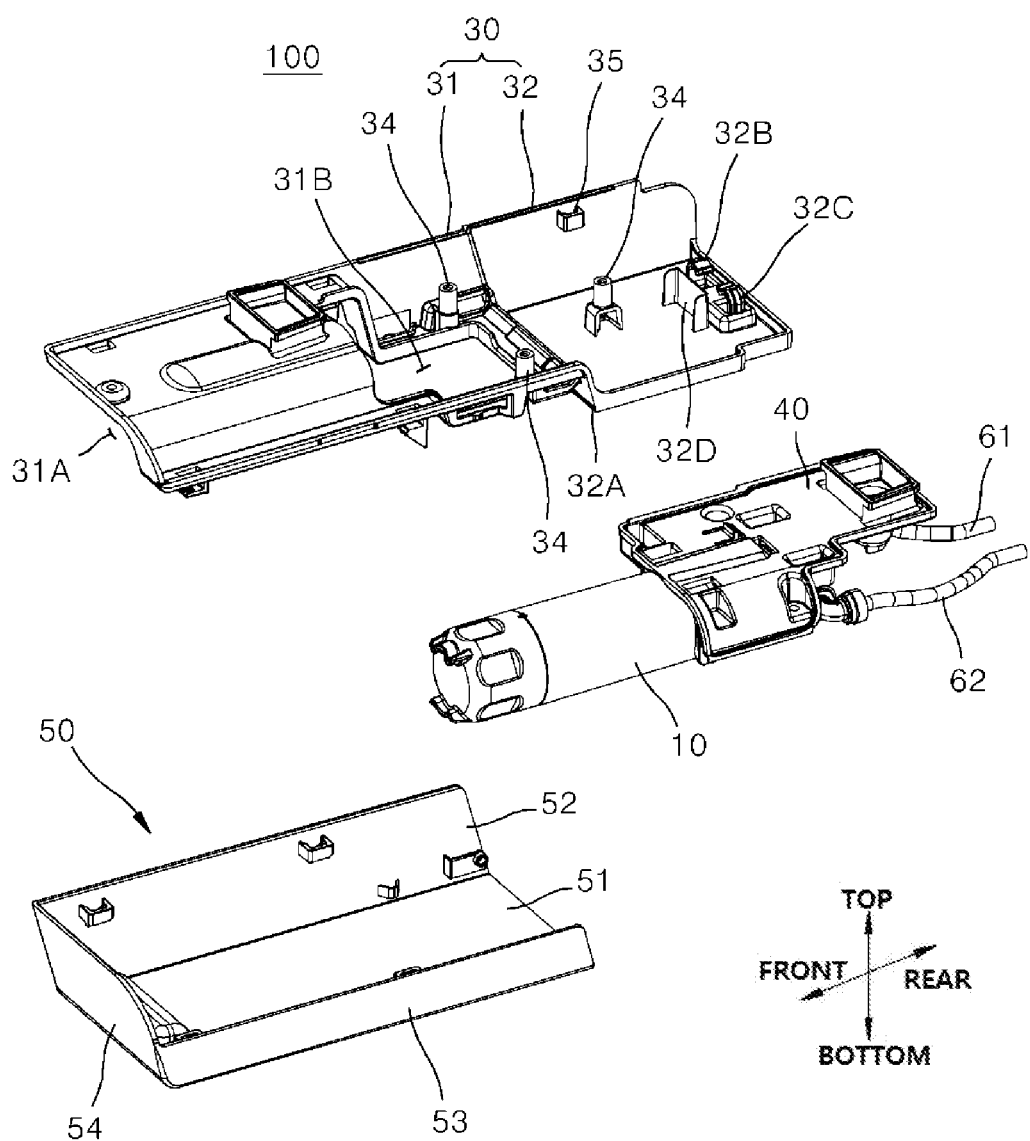
FIG. 4 is an exploded perspective diagram of FIG. 2.
Figure 5:
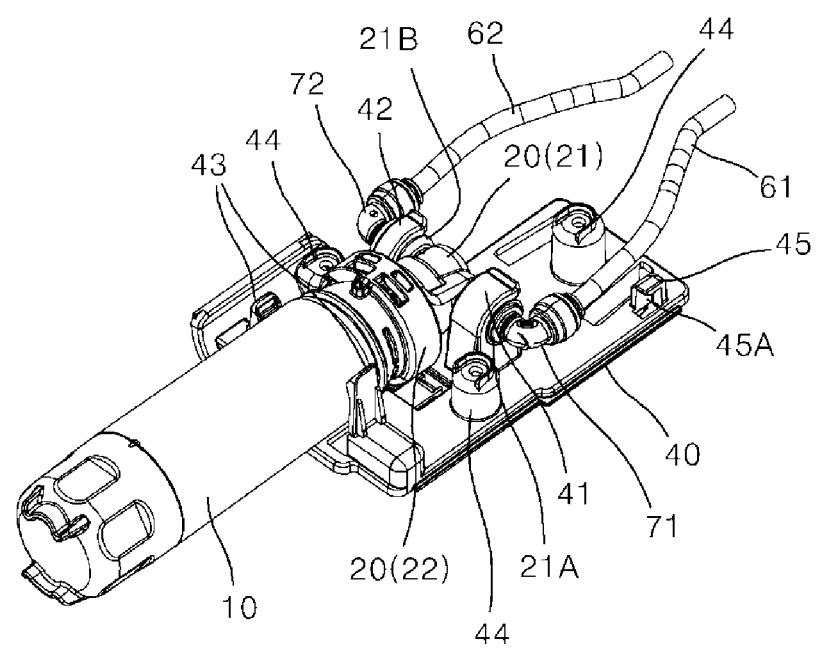
FIG. 5 is a perspective diagram illustrating the bottom surface of a filter and a filter bracket illustrated in FIG. 4.

FIG. 2 is a front side coupling perspective diagram illustrating the filter unit according to an embodiment of the present disclosure, FIG. 3 is a rear side coupling perspective diagram illustrating the filter unit according to an embodiment of the present disclosure, FIG. 4 is an exploded perspective diagram of FIG. 2, and FIG. 5 is a perspective diagram illustrating the bottom surface of a filter and a filter bracket illustrated in FIG. 4.

Referring to FIGS. 2 to 5, the filter unit 100 according to an embodiment of the present disclosure may be mounted to a home appliance in a sliding manner. Here, the home appliance may also be a water purifier, and a refrigerator having a function of the water purifier. The home appliance may include all home appliances in addition to the water purifier or the refrigerator.

A first sliding mount 1 and a second sliding mount 2 may be formed to protrude from the upper surface of the filter unit 100. The first sliding mount 1 and the second sliding mount 2 may be mounted to the home appliance in a sliding manner.

In addition, a screw hole 3 may be further formed in the upper surface of the filter unit 100. By inserting a screw into the screw hole 3, the filter unit 100 may be firmly fastened to the home appliance.

The filter unit 100 may include a filter 10, a filter head 20, a filter housing 30, a filter bracket 40, and a filter door 50.

The filter 10 may purify water. A flow path through which water moves may be formed inside the filter 10. A filter member which purifies water may be disposed inside the filter 10.

The filter 10 may be formed in a bar shape having a circular longitudinal section. One end portion of the filter 10 may be formed to have a smaller diameter than the rest of the filter 10.

The filter head 20 may be disposed on one end portion of the filter 10. An inlet port 21B and an outlet port 21A may be formed on the filter head 20.

The inlet port 21B and the outlet port 21A may be formed to protrude in directions opposite to each other. The inlet port 21B may be formed to protrude from one side of the filter head 20. The outlet port 21A may be formed to protrude from the other side of the filter head 20.

The inlet port 21B may supply raw water to the filter 10. The outlet port 21A may discharge pure water which is purified by the filter 10. The inlet port 21B and the outlet port 21A may have a flow path which is formed therein and communicated with the flow path within the filter 10. The longitudinal section of each of the inlet port 21B and the outlet port 21A may be formed in a ring shape.

A filter accommodation space 31A may be formed in the filter housing 30. The filter 10 may be accommodated in the filter accommodation space 31A. The filter housing 30 may include a front part 31 and a rear part 32. The front part 31 may extend forward from the front end of the rear part 32. The rear part 32 may extend rearward from the rear end of the front part 31.

A part of the front part 31 of the filter housing 30 may be formed to be convex upward and concave downward, and the concavely formed portion may be formed as the filter accommodation space 31A.

The front part 31 of the filter housing 30 may be disposed at a location higher than the rear part 32 of the filter housing 30. The lower plate of the rear part 32 may be disposed at a location lower than the front part 31. Accordingly, a step 32A which protrudes downward may be formed between the front part 31 and the rear part 32. The step 32A may form the front surface of the rear part 32.

The first sliding mount 1 may be formed to protrude from the outside of the filter housing 30. The first sliding mount 1 may be formed to protrude from the outside of the front part 31 of the filter housing 30. First sliding grooves 1A which are coupled to the home appliance may be formed at both sides of the first sliding mount 1. The home appliance may be provided with a projection which is coupled to the first sliding groove 1A in a sliding manner.

The second sliding mount 2 may be formed to protrude from the outside of the filter bracket 40. Second sliding grooves 2A which are coupled to the home appliance may be formed at both sides of the second sliding mount 2. The home appliance may be formed with a projection which is coupled to the second sliding groove 2A in a sliding manner.

The screw hole 3 may be formed in the front part 31 of the filter housing 30. The filter housing 30 may be firmly fastened to the home appliance by inserting a screw into the screw hole 3.

The filter housing 30 may be formed with an opening 31B which extends from the filter accommodation space 31A. When the filter 10 is accommodated in the filter accommodation space 31A, a part of the filter 10 may be disposed in the opening 31B. When the filter 10 is to be replaced, a user may open the filter door 50 and then rotates the filter 10 from the top to the bottom to protrude downward through the opening 31B, thereby easily replacing the filter 10.

The filter accommodation space 31A and the opening 31B may be formed in the front part 31. The filter accommodation space 31A may extend forward from the opening 31B, and the opening 31B may extend rearward from the filter accommodation space 31A.

The filter bracket 40 may be coupled to the filter housing 30. The filter bracket 40 may be disposed above the filter housing 30. The filter bracket 40 may be disposed above the front part 31 of the filter housing 30 and the rear part 32 of the filter housing 30 to cover the rear end portion of the opening 31B.

An inlet port coupling part 42 and an outlet port coupling part 41 may be formed on the filter bracket 40. The inlet port coupling part 42 and the outlet port coupling part 41 may be formed to protrude from the lower surface of the filter bracket 40.

The inlet port 21B of the filter head 20 may be rotatably coupled to the inlet port coupling part 42. The outlet port 21A of the filter head 20 may be rotatably coupled to the outlet port coupling part 41. Accordingly, when the filter 10 is to be replaced, the user may open the filter door 50 and then rotate the filter 10 in the opening direction (downward in FIG. 2) of the filter door 50, thereby easily separating the filter 10 from the filter head 20 and then coupling a new filter to the filter head 20.

The filter head 20 and the filter door 50 may be rotated in the same direction as each other.

A filter coupling part 43 may be further formed on the filter bracket 40. The filter coupling part 43 may be formed to protrude from the lower surface of the filter bracket 40.

The filter 10 may be detachably coupled to the filter coupling part 43. When replacing the filter 10, the user may easily separate the filter 10 from the filter coupling part 43, and easily couple a new filter to the filter coupling part 43.

The filter coupling part 43 may be formed to have an opened one side. The upper side of the filter coupling part 43 may be opened. If the user couples a new filter to the filter head 20 and then rotates the new filter in a direction opposite to the opening direction (upward in FIG. 2) of the filter door 50 when replacing the filter 10, the new filter may be inserted into the filter coupling part 43 while spreading the opened filter coupling part 43. When the new filter is inserted into the filter coupling part 43, the filter coupling part 43 may generate an elastic force to be restored to the original location while being spread by the circumferential surface of the new filter 10. After the new filter is completely inserted into the filter coupling part 43, the filter coupling part 43 may surround a part of the circumferential surface of the new filter while being contracted by the elastic force, thereby positionally fixing the new filter.

One sides of the inlet port coupling part 42 and the outlet port coupling part 41 may be formed to be opened. Accordingly, the inlet port 21B may be easily coupled to the inlet port coupling part 42, and the outlet port 21A may be easily coupled to the outlet port coupling part 41.

When the inlet port 21B is coupled to the inlet port coupling part 42, the inlet port coupling part 42 may be elastically spread by the circumferential surface of the inlet port 21B. After the inlet port 21B is completely inserted into the inlet port coupling part 42, the inlet port coupling part 42 may surround the circumferential surface of the inlet port 21B to positionally fix the inlet port 21B.

When the outlet port 21A is coupled to the outlet port coupling part 41, the outlet port coupling part 41 may be elastically spread by the circumferential surface of the outlet port 21A. After the outlet port 21A is completely inserted into the outlet port coupling part 41, the outlet port coupling part 41 may surround the circumferential surface of the outlet port 21A to positionally fix the outlet port 21A.

The inlet port coupling part 42 and the outlet port coupling part 41 may be opened in the same direction. The inlet port coupling part 42 and the outlet port coupling part 41 may be opened in a direction opposite to the filter 10.

A plurality of first fastening bosses 34 may be formed inside the filter housing 30. The plurality of first fastening bosses 34 may be formed to protrude upward from the upper surface of the filter housing 30. The plurality of first fastening bosses 34 may have two formed at the rear end portion of the front part 31 of the filter housing 30, and have one formed at the rear part 32 of the filter housing 30. Although it has been described that the number of the plurality of first fastening bosses 34 is three, the number of the plurality of first fastening bosses 34 may be two or more.

A plurality of second fastening bosses 44 may be formed inside the filter bracket 40. The plurality of second fastening bosses 44 may be formed to protrude downward from the lower surface of the filter bracket 40. The plurality of second fastening bosses 44 having the number corresponding to that of the plurality of first fastening bosses 34 may be formed at locations corresponding to those of the plurality of first fastening bosses 34. Although it has been described that the number of the plurality of second fastening bosses 44 is three, the number of the plurality of second fastening bosses 44 may be two or more.

The plurality of second fastening bosses 44 may be each fastened to the plurality of first fastening bosses 34 through screws.

A first fastening boss alignment guider 35 may be further formed inside the filter housing 30. A second fastening boss alignment guider 45 may be further formed inside the filter bracket 40. The second fastening boss alignment guider 45 may be coupled to the first fastening boss alignment guider 35 to align the plurality of first fastening bosses 34 and the plurality of second fastening bosses 44 with the fastening locations.

The first fastening boss alignment guider 35 may be formed as a projection. A groove into which the first fastening boss alignment guider 35 is inserted may be formed in the second fastening boss alignment guider 45. As the first fastening boss alignment guider 35 is inserted into the groove which is formed in the second fastening boss alignment guider 45, the plurality of first fastening boss alignment guiders 35 and the plurality of second fastening boss alignment guiders 45 may be aligned with the fastening locations.

The filter door 50 may be coupled to the filter housing 30 to open and close the filter accommodation space 31A. The filter door 50 may be disposed at the front part 31 of the filter housing 30. The filter door 50 may be disposed below the front part 31 of the filter housing 30 to cover the filter accommodation space 31A and the opening 31B.

The filter door 50 may include a lower plate 51, a first side plate 52, a second side plate 53, and a front plate 54. The lower plate 51 may form the lower surface of the filter door 50. The first side plate 52 may be formed to protrude upward from one side of the lower plate 51 to form one side surface of the filter door 50. The second side plate 53 may be formed to protrude upward from the other side of the lower plate 51 to form the other side surface of the filter door 50. The front plate 54 may be formed to protrude upward from the front end of the lower plate 51 to form the front surface of the filter door 50.

The first side plate 52 may be formed to protrude upward longer than the second side plate 53.

The first side plate 52 and the second side plate 53 of the filter door 50 may be coupled to the front part 31 of the filter housing 30 to be slidable back and forth. The rear end portion of the first side plate 52 and the rear end portion of the second side plate 53 may be rotatably coupled to the front part 31 of the filter housing 30. That is, if the user wants to open the filter door 50, when the user pulls the filter door 50 forward to allow the filter door 50 to protrude forward from the filter housing 30 and then pulls the front part of the filter door 50 downward, the filter door 50 is rotated around the rear end portion thereof, such that the front part of the filter door 50 may be spread downward to open the filter accommodation space 31A. A detailed structure related to the opening and closing of the filter door 50 will be described later with reference to FIGS. 10 to 14.

A handle groove 55 (see FIG. 14) may be formed in the lower surface of the lower plate 51 of the filter door 50. After the user inserts his or her finger into the handle groove 55, the user may easily open and close the filter door 50.

The filter unit 100 may further include an inlet tube 62 and an outlet tube 61. The raw water may be moved into the inlet tube 62. The purified water may be moved into the outlet tube 61.

The inlet tube 62 and the outlet tube 61 may be formed in different colors. For example, the inlet tube 62 may be formed in blue, and the outlet tube 61 may be formed in white. An operator may see the different colors of the inlet tube 62 and the outlet tube 61, and distinguish the inlet tube 62 and the outlet tube 61, thereby preventing the erroneous assembly of the inlet tube 62 and the outlet tube 61.

The inlet tube 62 may be coupled to the inlet port 21B through an inlet elbow 72. That is, one end of the inlet elbow 72 may be coupled to one end of the inlet tube 62, and the other end of the inlet elbow 72 may be rotatably coupled to the inlet port 21B.

The outlet tube 61 may be coupled to the outlet port 21A through an outlet elbow 71. That is, one end of the outlet elbow 71 may be coupled to one end of the outlet tube 61, and the other end of the outlet elbow 71 may be rotatably coupled to the outlet port 21A.

An inlet tube coupling part 32C and an outlet tube coupling part 32B may be formed in the filter housing 30. The inlet tube coupling part 32C and the outlet tube coupling part 32B may be formed on the upper surface of the rear part 32 of the filter housing 30.

The inlet tube 62 may be coupled to the inlet tube coupling part 32C. The outlet tube 61 may be coupled to the outlet tube coupling part 32B. The inlet tube coupling part 32C and the outlet tube coupling part 32B may have the opened insides opposite to each other.

Accordingly, the operator may insert the inlet tube 62 into the inlet tube coupling part 32C through the opened inside of the inlet tube coupling part 32C to hold the inlet tube 62 in the inlet tube coupling part 32C. In addition, the operator may insert the outlet tube 61 into the outlet tube coupling part 32B through the opened inside of the outlet tube coupling part 32B to hold the outlet tube 61 in the outlet tube coupling part 32B.

As described above, the inlet tube coupling part 32C and the outlet tube coupling part 32B have the opened insides opposite to each other, such that when the inlet tube 62 is coupled to the inlet tube coupling part 32C and the outlet tube 61 is coupled to the outlet tube coupling part 32B, the inlet tube 62 may escape through the opened inside of the inlet tube coupling part 32C, and the outlet tube 61 may escape through the opened inside of the outlet tube coupling part 32B. In order to prevent such separation, the filter housing 30 may be further formed with a tube anti-separation projection 32D.

The tube anti-separation projection 32D may be formed on the upper surface of the rear part 32 of the filter housing 30. The tube anti-separation projection 32D may be disposed between the inlet tube coupling part 32C and the outlet tube coupling part 32B, and the filter head 20.

The tube anti-separation projection 32D may prevent the inlet tube 62 and the outlet tube 61 from being separated. To this end, both sides of the tube anti-separation projection 32D may be located outward from the inside of the inlet tube coupling part 32C and the inside of the outlet tube coupling part 32B.

Figure 6:
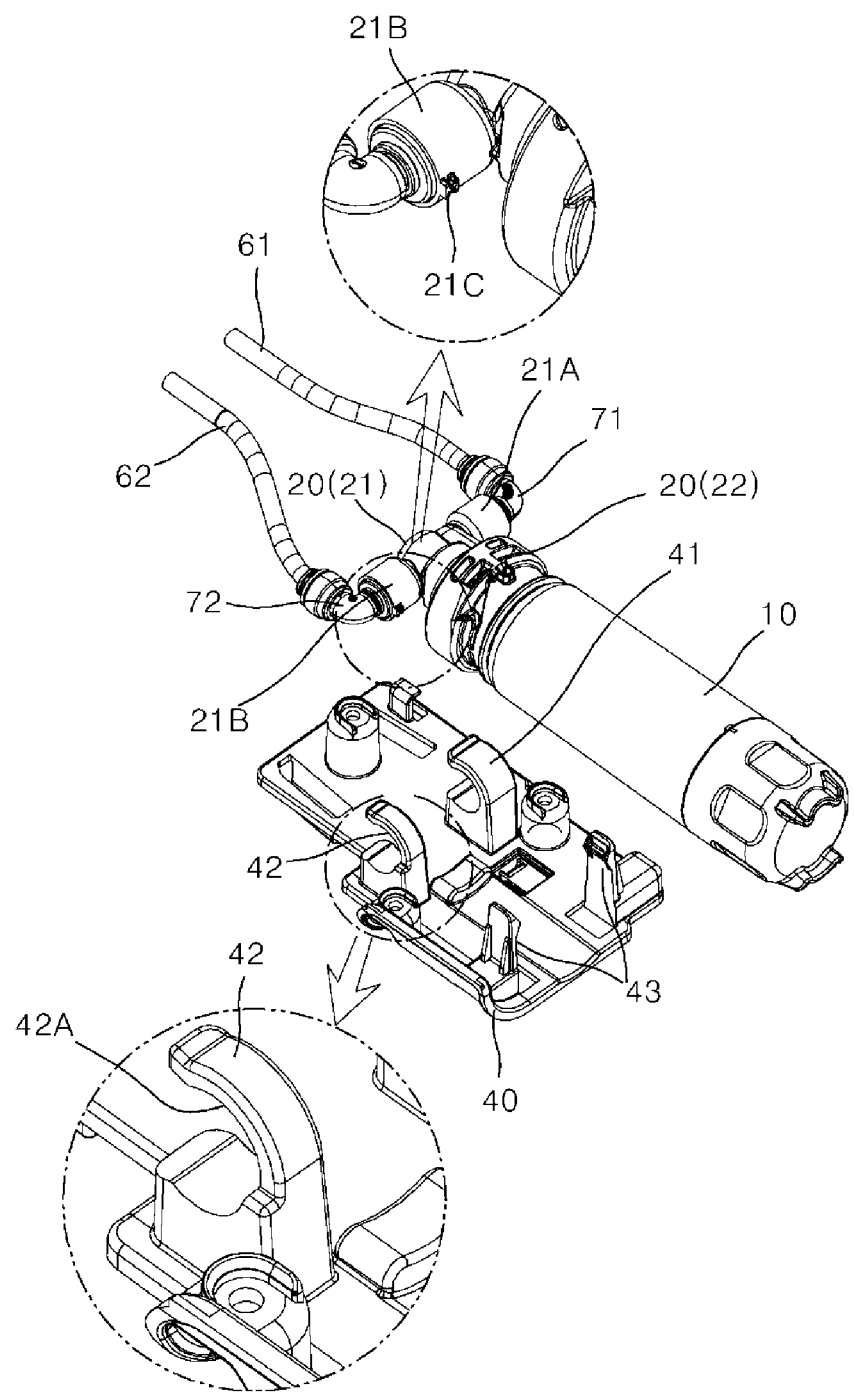
FIG. 6 is an exploded perspective diagram of FIG. 5.

FIG. 6 is an exploded perspective diagram of FIG. 5.

Referring to FIG. 6, a rotation location regulating projection 21C may be formed on the outer circumferential surface of the inlet port 21B. A hole 42A or a groove may be formed in the inlet port coupling part 42. The hole 42A or the groove may be formed in a long arc shape in the rotational direction of the inlet port 21B.

Although it has been described that the hole 42A or the groove is formed by cutting one side of the inlet port coupling part 42, the hole 42A or the groove may also be formed on the inner circumferential surface of the inlet port coupling part 42.

When the filter 10 is coupled to the filter coupling part 43, the hole 42A or the groove may regulate the rotation location of the rotation location regulating projection 21C.

Meanwhile, the rotation location regulating projection 21C is not formed on the outer circumferential surface of the inlet port 21B, but may also be formed on the outer circumferential surface of the outlet port 21A. In this case, the hole 42A or the groove may also be formed in the outlet port 21A.

As described above, the rotation location regulating projection 21C may be formed on the outer circumferential surface of one of the inlet port 21B and the outlet port 21A, and the hole 42A or the groove may be formed in one of the inlet port coupling part 42 and the outlet port coupling part 41, thereby preventing the assembly locations of the inlet port 21B and the outlet port 21A from being interchanged with each other.

Figure 7:
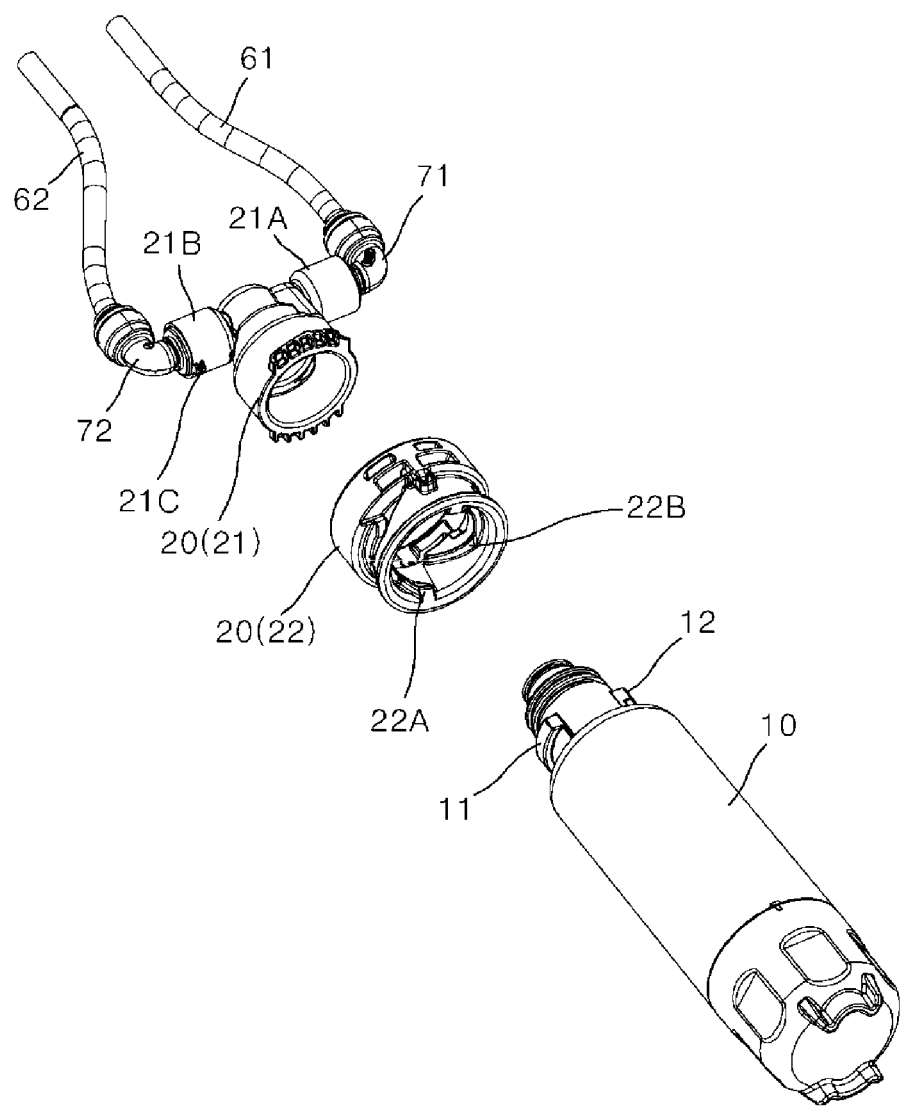
FIG. 7 is an exploded perspective diagram of the filter and a filter head illustrated in FIG. 6.
Figure 8:
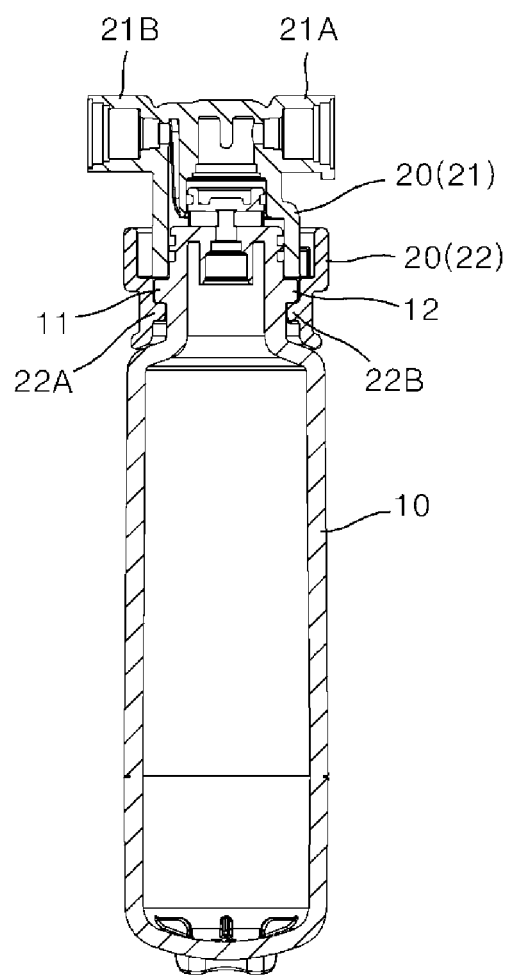
FIG. 8 is a side cross-sectional diagram of the coupled state between the filter and the filter head illustrated in FIG. 6.
Figure 9:
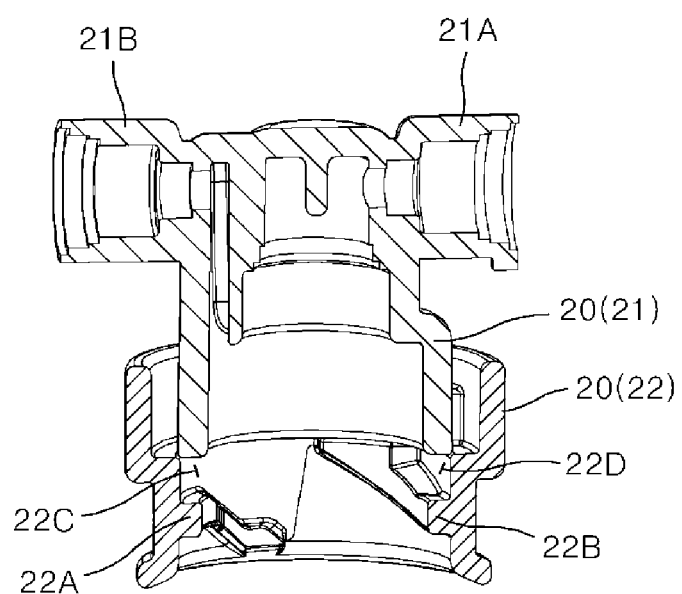
FIG. 9 is a cut perspective diagram of the coupled state between a filter head main body and a filter head bracket illustrated in FIG. 8.

FIG. 7 is an exploded perspective diagram of the filter and the filter head illustrated in FIG. 6, FIG. 8 is a side cross-sectional diagram of the coupled state of the filter and the filter head illustrated in FIG. 6, and FIG. 9 is a cut perspective diagram of the coupled state of a filter head main body and a filter head bracket illustrated in FIG. 8.

Referring to FIGS. 7 to 9, the filter head 20 may include a filter head main body 21 and a filter head bracket 22.

The inlet port 21B and the outlet port 21A may be formed on the filter head main body 21.

The filter head bracket 22 may be formed in a ring shape. The filter head bracket 22 may couple the filter head main body 21 to one end of the filter 10. That is, one end of the filter head main body 21 may be inserted into one end of the filter head bracket 22 to be coupled with the filter head bracket 22, and one end of the filter 10 may be inserted into the other end of the filter head bracket 22 to be coupled with the filter head bracket 22.

A first spiral projection 22A and a second spiral projection 22B may be formed on the inner circumferential surface of the filter head bracket 22. The first spiral projection 22A and the second spiral projection 22B may be formed separately from each other.

A first coupling projection 11 and a second coupling projection 12 may be formed on the outer circumferential surface of one end of the filter 10. The first coupling projection 11 and the second coupling projection 12 may be formed to protrude from the outer circumferential surface of one end of the filter 10 in directions opposite to each other.

The user may insert one end of the filter 10 into the filter head bracket 22 to locate the first coupling projection 11 and the second coupling projection 12 between the first spiral projection 22A and the second spiral projection 22B, and then rotate the filter 10 in the circumferential direction of the filter 10 to couple the filter 10 to the filter head bracket 22.

When one end of the filter 10 is inserted into the filter head bracket 22 and the filter 10 is rotated at a predetermined angle in the circumferential direction, the filter 10 may be separated from the filter head bracket 22 of the filter head 20, or the filter 10 may be coupled to the filter head bracket 22 of the filter head 20. This is because the filter 10 is coupled to or separated from the filter head bracket 22 only by separating the first spiral projection 22A and the second spiral projection 22B from each other to rotate the filter 10 at a predetermined angle in the circumferential direction.

When one end of the filter 10 is inserted into the filter head bracket 22 to be coupled to the filter head bracket 22, the first coupling projection 11 may be engaged with the first spiral projection 22A, and the second coupling projection 12 may be engaged with the second spiral projection 22B.

When the filter 10 is coupled to or separated from the filter head bracket 22, a first inclined surface may be formed on both ends of the rotational direction of each of the first coupling projection 11 and the second coupling projection 12, and a second inclined surface having a shape corresponding to the first inclined surface may be formed on both ends of each of the first spiral projection 22A and the second spiral projection 22B, in order to facilitate the initial rotation of the filter 10 and firmly couple the filter 10 to the filter head bracket 22.

A first coupling groove 22C and a second coupling groove 22D may be formed in the filter head bracket 22. The first coupling groove 22C may be a space between the first spiral projection 22A and the filter head main body 21. The second coupling groove 22D may be a space between the second spiral projection 22B and the filter head main body 21. When the first coupling projection 11 is engaged with the first spiral projection 22A and the second coupling projection 12 is engaged with the second spiral projection 22B, the first coupling projection 11 may be inserted into and coupled to the first coupling groove 22C, and the second coupling projection 12 may be inserted into and coupled to the second coupling groove 22D.

Alternatively, the first coupling projection 11 may also be engaged with the second spiral projection 22B, and the second coupling projection 12 may also be engaged with the first spiral projection 22A. In such a state, the first coupling projection 11 may be inserted into and coupled to the second coupling groove 22D, and the second coupling projection 12 may be inserted into and coupled to the first coupling groove 22C.

Figure 10:
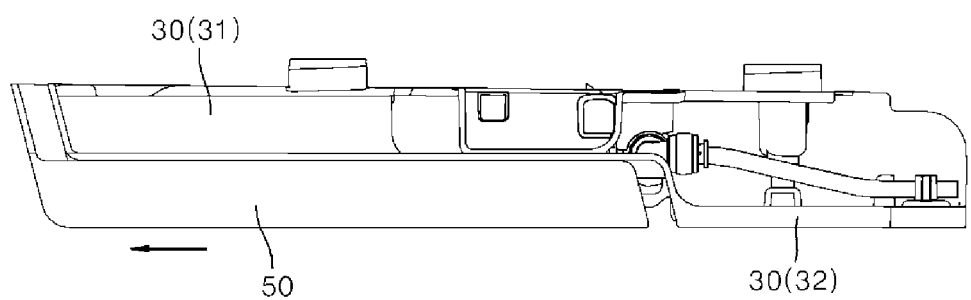
FIG. 10 is a side diagram of the filter unit according to an embodiment of the present disclosure, illustrating a state where a filter door is slid to be opened.
Figure 11:
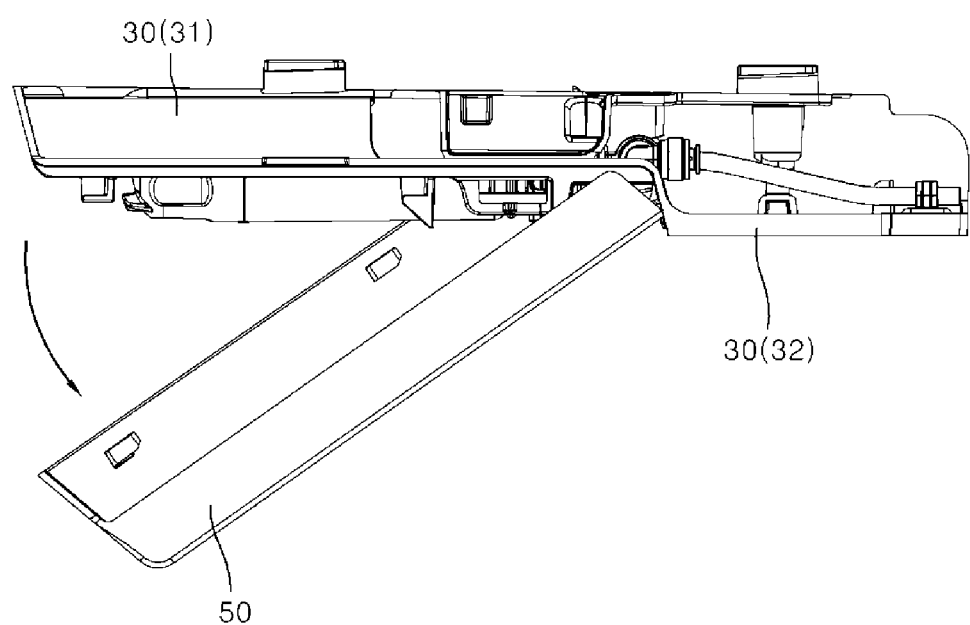
FIG. 11 is a side diagram of the filter unit according to an embodiment of the present disclosure, illustrating a state where the filter door is rotated and opened.

FIG. 10 is a side diagram of the filter unit according to an embodiment of the present disclosure, illustrating a state where the filter door is slid to be opened, and FIG. 11 is a side diagram of the filter unit according to an embodiment of the present disclosure, illustrating a state where the filter door is rotated to be opened.

Referring to FIGS. 10 and 11, when the filter door 50 is opened, the filter door 50 may be pulled forward by the user to be slid forward as illustrated in FIG. 10, and then the front part thereof may be spread to be opened as illustrated in FIG. 11. Of course, the closing of the filter door 50 may be performed in reverse order of the opening.

Hereinafter, a configuration related to the opening and closing of the filter door 50 will be described.

Figure 12:
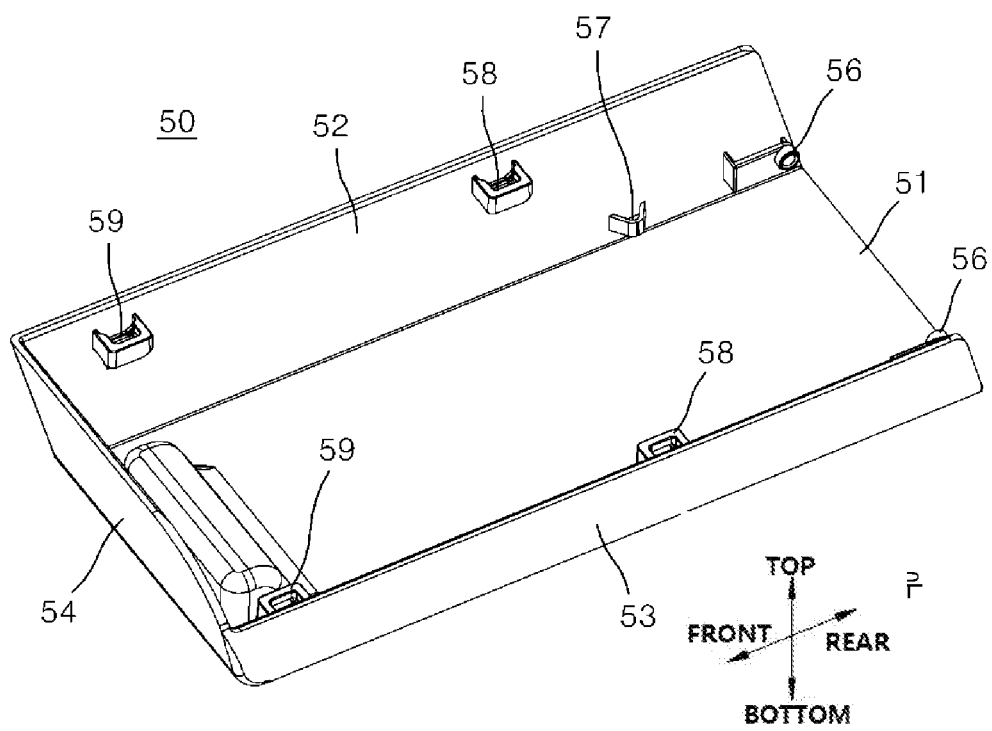
FIG. 12 is a perspective diagram illustrating the inside of the filter door illustrated in FIG. 2.
Figure 13:
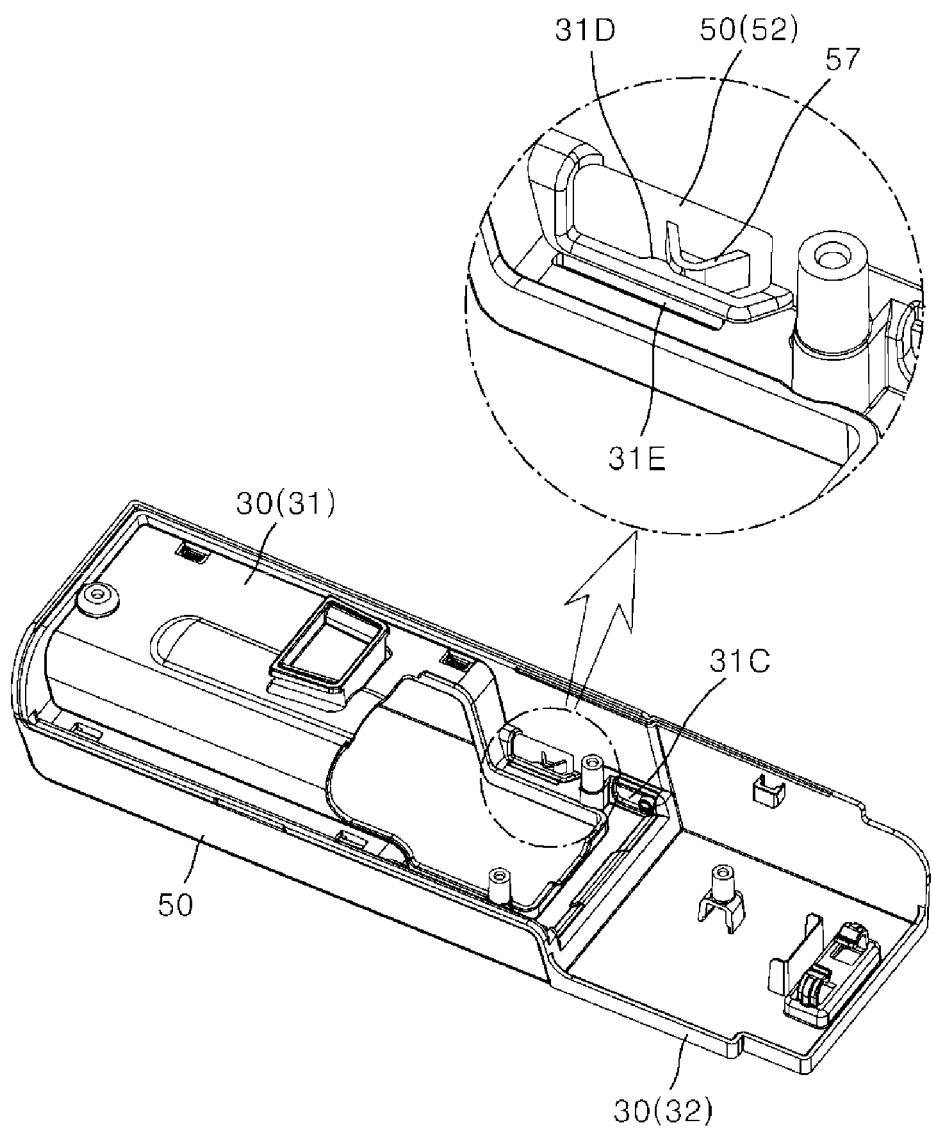
FIG. 13 is a coupling perspective diagram illustrating a filter housing and the filter door illustrated in FIG. 2.
Figure 14:
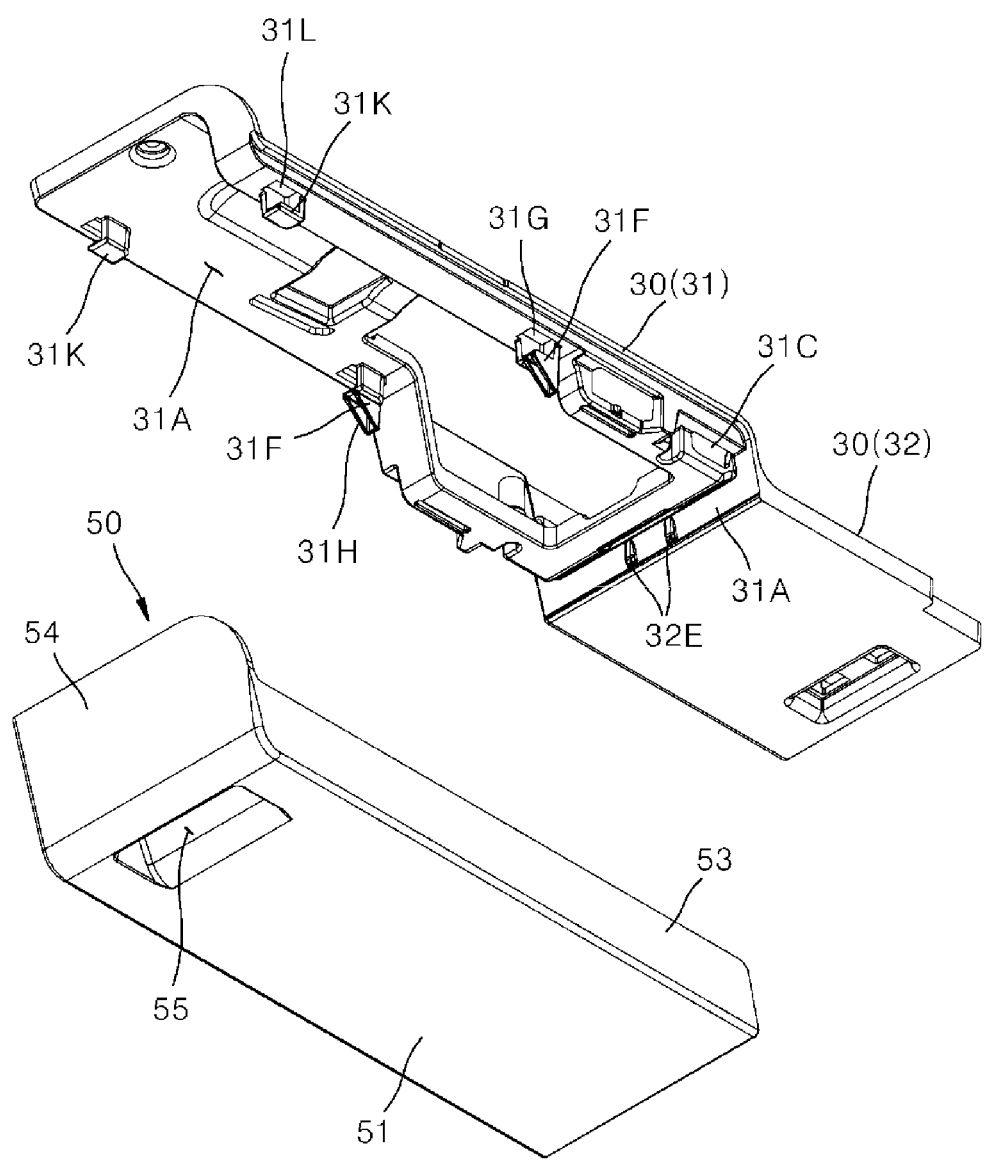
FIG. 14 is a bottom side exploded perspective diagram illustrating the filter housing and the filter door illustrated in FIG. 13.

FIG. 12 is a perspective diagram illustrating the inside of the filter door illustrated in FIG. 2, FIG. 13 is a coupling perspective diagram illustrating the filter housing and the filter door illustrated in FIG. 2, and FIG. 14 is a bottom side exploded perspective diagram illustrating the filter housing and the filter door illustrated in FIG. 13.

Referring to FIGS. 12 to 14, a coupling projection 56 may be formed inside the filter door 50. The coupling projections 56 may be each formed on both surfaces of the inside of the filter door 50. That is, the coupling projections 56 may be each formed inside the first side plate 52 and inside the second side plate 53.

A coupling hole 31C may be formed in the filter housing 30. The coupling hole 31C may be formed at a location corresponding to the coupling projection 56, and the number of the coupling holes 31C may correspond to the number of the coupling projections 56. The coupling hole 31C may be formed in the rear end portion of the front part 31 of the filter housing 30.

The coupling projection 56 may be inserted into the coupling hole 31C. The coupling projection 56 may penetrate the coupling hole 31C inward from the outside thereof. As the coupling projection 56 is inserted into the coupling hole 31C, the filter door 50 is slidable back and forth to the filter housing 30 and may be coupled to the filter housing 30 to be rotatable around the coupling projection 56.

In order to rotate the filter door 50, the coupling projection 56 is preferably formed in a circular shape.

The coupling hole 31C may be formed lengthily in the sliding direction (forward and rearward) of the filter door 50. When the filter door 50 is opened and closed, the filter door 50 is slidable until the coupling projection 56 contacts the front end wall or the rear end wall of the coupling hole 31C within the coupling hole 31C.

In addition, a first fixing projection 57 may be formed inside the filter door 50. The first fixing projections 57 may be each formed on both surfaces of the inside of the filter door 50. That is, the first fixing projections 57 may be each formed on the inside of the first side plate 52 and the inside of the second side plate 53. The first fixing projection 57 may be located further forward than the coupling projection 56.

A second fixing projection 31D and a slit 31E may be formed in the filter housing 30. The second fixing projection 31D and the slit 31E may be formed at locations corresponding to the first fixing projection 57, and the number of the second fixing projections 31D and the slits 31E may each correspond to the number of the first fixing projections 57. The second fixing projection 31D and the slit 31E may be located further forward than the coupling hole 31C.

When the filter door 50 is slid, the first fixing projection 57 may pass over the second fixing projection 31D.

The second fixing projection 31D may fix the first fixing projection 57 to the closed location of the filter door 50. That is, when the filter door 50 is closed, the second fixing projection 31D may contact the first fixing projection 57 to prevent the filter door 50 from being opened by an impact or a small external force.

The slit 31E may provide an elastic force to the second fixing projection 31D. The slit 31E may be formed lengthily in the sliding direction of the filter door 50. The slit 31E may provide an elastic force to the second fixing projection 31D, thereby implementing a smooth fastening feeling between the first fixing projection 57 and the second fixing projection 31D when the filter door 50 is slid, and preventing the abrasion of the first fixing projection 57 and the second fixing projection 31D.

In addition, a first guide projection 58 may be formed inside the filter door 50. The first guide projections 58 may be each formed on both surfaces of the inside of the filter door 50. That is, the first guide projections 58 may be each formed on the inside of the first side plate 52 and the inside of the second side plate 53. The first guide projection 58 may be located further forward than the first fixing projection 57.

A second guide projection 31F may be formed in the filter housing 30. The second guide projection 31F may be formed at a location corresponding to the first guide projection 58, and the number of the second guide projections 31F may correspond to the number of the first guide projections 58. The second guide projection 31F may be formed at the front part 31 of the filter housing 30. The second guide projection 31F may be located further forward than the second fixing projection 31D and the slit 31E.

A first guide part 31G and an inclined surface 31H may be formed on the second guide projection 31F.

The first guide part 31G may be formed in a groove shape. The first guide part 31G may be formed to have an opened front on the side surface of the second guide projection 31F. When the filter door 50 is slid, the first guide projection 58 may be inserted into the first guide part 31G. That is, the first guide part 31G may guide the first guide projection 58 when the filter door 50 is slid.

The inclined surface 31H may form the lower surface of the second guide projection 31F. The inclined surface 31H may guide the first guide projection 58 to the first guide part 31G when the filter door 50 is rotated to be closed. That is, when the user lifts the filter door 50 upward to close the filter door 50 in a state where the filter door 50 is opened as illustrated in FIG. 11, the first guide projection 58 is moved along the inclined surface 31H of the second guide projection 31F to be inserted into the first guide part 31G, such that the filter door 50 may be smoothly moved to a location at which the filter door 50 may be slid rearward.

In addition, a third guide projection 59 may be further formed inside the filter door 50. The third guide projections 59 may be each formed on both surfaces of the inside of the filter door 50. That is, the third guide projections 59 may be each formed inside the first side plate 52 and inside the second side plate 53. The third guide projection 59 may be formed on the front part 31 of the filter door 50. The third guide projection 59 may be located further forward than the first guide projection 58.

A fourth guide projection 31K may be further formed in the filter housing 30. The fourth guide projection 31K may be formed at a location corresponding to the third guide projection 59, and the number of the fourth guide projections 31K may correspond to the number of the third guide projections 59. The fourth guide projection 31K may be formed on the front part 31 of the filter housing 30. The fourth guide projection 31K may be located further forward than the second guide projection 31F.

A second guide part 31L may be formed in the fourth guide projection 31K. The second guide part 31L may be formed in a groove shape. The second guide part 31L may be formed to have an opened front on the side surface of the fourth guide projection 31K. When the filter door 50 is slid, the third guide projection 59 may be inserted into the second guide part 31L. That is, the second guide part 31L may guide the third guide projection 59 when the filter door 50 is slid.

The coupling projection 56 and the first fixing projection 57 may be formed at the same height inside the filter door 50. The first guide projection 58 and the third guide projection 59 may be formed at the same height inside the filter door 50. The coupling projection 56 and the first fixing projection 57 may be formed at the height lower than those of the first guide projection 58 and the third guide projection 59 inside the filter door 50. The first guide projection 58 and the third guide projection 59 may be formed at the height higher than those of the coupling projection 56 and the first fixing projection 57 inside the filter door 50.

Meanwhile, a support part 32E may be formed in the filter housing 30. The support part 32E may be formed to protrude from a portion corresponding to the rear end of the filter door 50. As illustrated in FIG. 2, the support part 32E may support the rear end of the filter door 50 in a state where the filter door 50 is closed, thereby preventing the bending of the filter door 50.

The support part 32E may be formed in the step 32A which forms the front surface of the rear part 32 of the filter housing 30. Although it has been described that two support parts 32E are formed, at least one support part 32E may be formed. The support part 32E may be formed in the form of a projection having a curved surface capable of supporting the rear end of the filter door 50 in a state where the filter door 50 is closed. The support part 32E is not limited to being formed in the form of the projection having the curved surface, and may also be formed to protrude in a step shape.

An operation of replacing the filter of the filter unit according to an embodiment of the present disclosure configured as described above will be described as follows.

Figure 15:
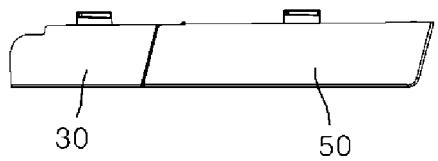
FIG. 15 is a diagram illustrating a filter replacement process of the filter unit according to an embodiment of the present disclosure.
Figure 15:
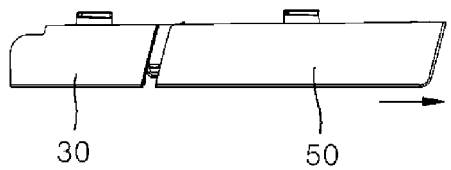
Figure 15:
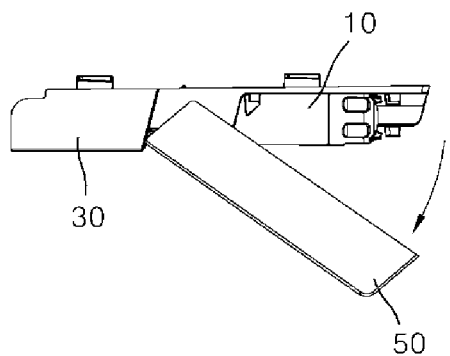
Figure 15:
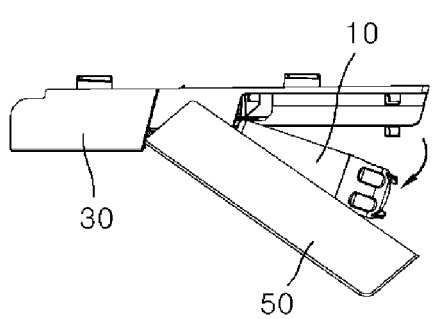
Figure 15:
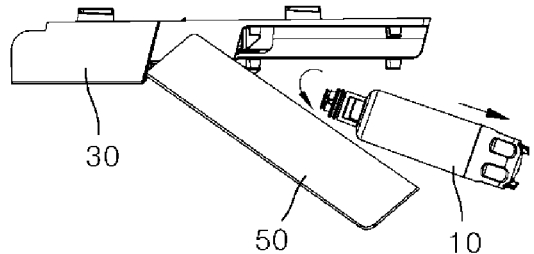

FIG. 15 is a diagram illustrating a filter replacement process of the filter unit according to an embodiment of the present disclosure.

Referring to FIG. 5 and FIGS. 12 to 15, in a state where the filter door 50 is closed as illustrated in FIG. 15A, the user pulls the filter door 50 to the right in the drawing in order to replace the filter 10.

Accordingly, as illustrated in FIG. 15B, the filter door 50 protrudes from the filter housing 30 while being slid to the right by about 10 mm. Here, the reason why the filter door 50 is slid to the right by about 10 mm is because the maximum distance at which the coupling projection 56 may move within the coupling hole 31C is about 10 mm, and the sliding movement distance of the filter door 50 may be variously changed based on the length of the coupling hole 31C.

Thereafter, the user pulls the filter door 50 downward as illustrated in FIG. 15C. Accordingly, the filter door 50 is opened by being rotated around the coupling projection 56.

Thereafter, the user pulls the filter 10 downward as illustrated in FIG. 15D. Accordingly, the filter 10 escapes from the filter coupling part 43 while being rotated around the inlet port 21B and the outlet port 21A.

Thereafter, the user rotates the filter 10 in the circumferential direction of the filter 10 as illustrated in FIG. 15E. Accordingly, the filter 10 is separated from the filter head bracket 22 of the filter head 20. Thereafter, the user may close the filter door 50 after coupling a new filter to the filter head bracket 22 of the filter head 20.

As described above, since the filter unit 100 according to an embodiment of the present disclosure includes the filter head 20 which is disposed at one end of the filter 10 and coupled rotatably to the filter bracket 40, and the filter door 50 which opens and closes the filter accommodation space 31A formed in the filter housing 30, the user may rotate the filter 10 to a location at which the user easily grips the filter 10 by hand after opening the filter door 50, thereby easily replacing the filter 10.

In addition, the rotation location regulating projection 21C may be formed on the outer circumferential surface of one of the inlet port 21B and the outlet port 21A which are formed on the filter head 20, and one of the inlet port coupling part 42 and the outlet port coupling part 41 which are formed on the filter bracket 40 may be formed with the hole 42A or the groove which regulates the rotation location of the rotation location regulating projection 21C when the filter 10 is coupled to the filter coupling part 43, thereby preventing the assembly locations of the inlet port 21B and the outlet port 21A from being interchanged with each other.

In addition, since the inlet tube coupling part 32C and the outlet tube coupling part 32B which are formed in the filter housing 30 are formed to have opened insides opposite to each other, and both sides of the tube anti-separation projection 32D which is formed in the filter housing 30 are located outward from the inside of the inlet tube coupling part 32C and the inside of the outlet tube coupling part 32B, the inlet tube 62 may not be easily separated from the inlet tube coupling part 32C and the outlet tube 61 may not be easily separated from the outlet tube coupling part 32B, thereby firmly coupling the inlet tube 62 and the outlet tube 61 to the filter housing 30.

Those skilled in the art to which the present disclosure pertains will appreciate that the present disclosure may be carried out in other specific forms without changing the technical spirit or essential features thereof. Accordingly, it should be understood that the embodiments described above are exemplary in all respects and not restrictive. The scope of the present disclosure is defined by the following claims rather than the above description, and it should be construed that all changed or modified forms derived from the meaning and scope of the claims and their equivalents thereto are included in the scope of the present disclosure.

What is claimed is:

1. A filter unit comprising:
   a filter which purifies water:
   a filter head which is disposed on one end portion of the filter, and comprises an inlet port which supplies raw water to the filter and is formed to protrude from one side thereof, and an outlet port which discharges pure water purified by the filter and is formed to protrude from another side thereof;
   a filter housing which is formed with a filter accommodation space in which the filter is accommodated;
   a filter bracket which is coupled to the filter housing, and comprises an inlet port coupling part to which the inlet port is coupled rotatably, and an outlet port coupling part to which the outlet port is coupled rotatably; and
   a filter door which is coupled to the filter housing to open and close the filter accommodation space,
   wherein the filter bracket is further formed with a filter coupling part to which the filter is detachably coupled,
   wherein an outer circumferential surface of one of the inlet port and the outlet port is formed with a rotation location regulating projection,
   wherein the inlet port is assembled with the inlet port coupling part and the outlet port is assembled with the outlet port coupling part, and one of the inlet port coupling part and the outlet port coupling part being assembled with the one of the inlet port and the outlet port formed with the rotation location regulating projection is formed with a hole or groove which prevents assembly locations of the inlet port and the outlet port from being interchanged with each other and regulates the rotation location of the rotation location regulating projection when the filter is coupled to the filter coupling part,
   wherein the filter housing comprises a front part, and a rear part which is disposed at a location where a lower plate thereof is lower than the front part,
   wherein the front part is formed with the filter accommodation space, and an opening which extends rearward from the filter accommodation space,
   wherein a part of the filter is disposed in the opening, when the filter is accommodated in the filter accommodation space,
   wherein the filter door is disposed below the front part to cover the filter accommodation space and the opening,
   wherein the filter bracket is disposed above the front part and the rear part to cover the rear end portion of the opening,
   wherein a first sliding mount, on which first sliding grooves configured to be coupled to a home appliance are formed at both sides thereof, is formed to protrude from the outside of the filter housing, and
   wherein a second sliding mount, on which second sliding grooves configured to be coupled to the home appliance are formed at both sides thereof, is formed to protrude from an outside of the filter bracket,
   wherein the filter unit further comprises an inlet tube through which the raw water is moved, and an outlet tube through which the pure water is moved,
   wherein the filter housing is formed with an inlet tube coupling part to which the inlet tube is coupled, and an outlet tube coupling part to which the outlet tube is coupled,
   wherein the inlet tube coupling part and the outlet tube coupling part are formed to have opened insides opposite to each other,
   wherein the filter housing is formed with a tube anti-separation projection which prevents the inlet tube and the outlet tube from being separated, and
   wherein sides of the tube anti-separation projection are located outward from the inside of the inlet tube coupling part and the inside of the outlet tube coupling part.

2. The filter unit of claim 1,
   wherein the filter coupling part is formed to have an opened one side.

3. The filter unit of claim 1,
   wherein the inlet port coupling part and the outlet port coupling part are formed to have opened one sides.

4. The filter unit of claim 1,
   wherein the filter head comprises a filter head main body on which the inlet port and the outlet port are formed, and a filter head bracket having a ring shape which couples the filter head main body to one end of the filter,
   wherein the inner circumferential surface of the filter head bracket is formed with a first spiral projection, and a second spiral projection which is separated from the first spiral projection, and
   wherein an outer circumferential surface of one end of the filter is formed with a first coupling projection which is engaged with the first spiral projection, and a second coupling projection which is engaged with the second spiral projection.

5. The filter unit of claim 4,
   wherein the first coupling projection is coupled to a first coupling groove which is a space between the first spiral projection and the filter head main body within the filter head bracket, and
   wherein the second coupling projection is coupled to a second coupling groove which is a space between the second spiral projection and the filter head main body within the filter head bracket.

6. The filter unit of claim 1,
   wherein an inside of the filter housing is formed with a plurality of first fastening bosses, and a first fastening boss alignment guider, and
   wherein an inside of the filter bracket is formed with a plurality of second fastening bosses which are each fastened to the plurality of first fastening bosses through screws, and a second fastening boss alignment guider which is coupled to the first fastening boss alignment guider to align the plurality of first fastening bosses and the plurality of second fastening bosses with fastening locations.

7. The filter unit of claim 1,
   wherein the tube anti-separation projection is disposed between the inlet tube coupling part and the outlet tube coupling part, and the filter head.

8. The filter unit of claim 1,
   wherein the filter housing comprises a support part which is formed to protrude from a portion corresponding to a rear end of the filter door and supports the rear end of the filter door in a state where the filter is closed.

9. The filter unit of claim 1,
wherein an inside of the filter door is formed with a first fixing projection, and
wherein the filter housing is formed with a second fixing projection over which the first fixing projection passes when the filter door is slid and which fixes the first fixing projection to the closed location of the filter door, and a slit which provides an elastic force to the second fixing projection.

10. The filter unit of claim 1,
wherein the inside of the filter door is formed with a first guide projection,
wherein the filter housing is formed with a second guide projection on which a first guide part for guiding the first guide projection is formed when the filter door is slid, and
wherein the second guide projection is formed with an inclined surface which guides the first guide projection to the first guide part when the filter door is rotated to be closed.

11. The filter unit of claim 10,
wherein the inside of the filter door is further formed with a third guide projection, and
wherein the filter housing is further formed with a fourth guide projection on which a second guide part for guiding the third guide projection is formed when the filter door is slid.

12. The filter unit of claim 1,
wherein the filter housing is further formed with a screw hole configured to be fastened to the home appliance through a screw.

13. A refrigerator comprising:
a first compartment;
a second compartment; and
a filter unit which is located on a side upper portion inside the first compartment or the second compartment,
wherein the filter unit comprises:
a filter head which is disposed on one end portion of a filter, and comprises an inlet port which supplies raw water to the filter and is formed to protrude from one side thereof, and an outlet port which discharges pure water purified by the filter and is formed to protrude from another side thereof;
a filter housing which is formed with a filter accommodation space in which the filter is accommodated;
a filter bracket which is coupled to the filter housing, and comprises an inlet port coupling part to which the inlet port is coupled rotatably, and an outlet port coupling part to which the outlet port is coupled rotatably; and
a filter door which is coupled to the filter housing to open and close the filter accommodation space,
wherein the filter bracket is further formed with a filter coupling part to which the filter is detachably coupled,
wherein an outer circumferential surface of one of the inlet port and the outlet port is formed with a rotation location regulating projection,
wherein the inlet port is assembled with the inlet port coupling part and the outlet port is assembled with the outlet port coupling part, and one of the inlet port coupling part and the outlet port coupling part being assembled with the one of the inlet port and the outlet port formed with the rotation location regulating projection is formed with a hole or a groove which prevents assembly locations of the inlet port and the outlet port from being interchanged with each other and regulates the rotation location of the rotation location regulating projection when the filter is coupled to the filter coupling part,
wherein the filter housing comprises a front part, and a rear part which is disposed at a location where a lower plate thereof is lower than the front part,
wherein the front part is formed with the filter accommodation space, and an opening which extends rearward from the filter accommodation space,
wherein a part of the filter is disposed in the opening, when the filter is accommodated in the filter accommodation space,
wherein the filter door is disposed below the front part to cover the filter accommodation space and the opening,
wherein the filter bracket is disposed above the front part and the rear part to cover the rear end portion of the opening,
wherein a first sliding mount, on which first sliding grooves configured to be coupled to the refrigerator are formed at both sides thereof, is formed to protrude from the outside of the filter housing, and
wherein a second sliding mount, on which second sliding grooves configured to be coupled to the refrigerator are formed at both sides thereof, is formed to protrude from an outside of the filter bracket,
wherein the filter unit further comprises an inlet tube through which the raw water is moved, and an outlet tube through which the pure water is moved,
wherein the filter housing is formed with an inlet tube coupling part to which the inlet tube is coupled, and an outlet tube coupling part to which the outlet tube is coupled,
wherein the inlet tube coupling part and the outlet tube coupling part are formed to have opened insides opposite to each other,
wherein the filter housing is formed with a tube anti-separation projection which prevents the inlet tube and the outlet tube from being separated, and
wherein sides of the tube anti-separation projection are located outward from the inside of the inlet tube coupling part and the inside of the outlet tube coupling part.

14. The filter unit of claim 1, wherein the filter door comprises a lower plate forming a lower surface of the filter door, a first side plate and a second side plate forming side surfaces of the filter door, the lower plate forming a front surface of the filter door,
wherein the first side plate and the second side plate of the filter door are coupled to the front part of the filter housing to be slidable back and forth along a length direction of the filter door.

15. The filter unit of claim 14, wherein a rear end portion of the first side plate and a rear end portion of the second side plate are rotatably coupled to the front part of the filter housing such that the filter door is configured to move forward from the filter housing and then the front part of the filter door moves downward so as to allow the filter door to rotate around a rear end portion thereof.

16. The filter unit of claim 1, wherein at least some portion of the filter is disposed outside the opening.

17. The filter unit of claim 1, wherein only one of the inlet port coupling part and the outlet port coupling part being assembled with the one of the inlet port and the outlet port formed with the rotation location regulating projection is formed with the hole or the groove.

18. The filter unit of claim 17, wherein the other one of the inlet port coupling part and the outlet port coupling part not being assembled with the one of the inlet port and the outlet port formed with the rotation location regulating projection is not formed with a hole or a groove.

* * * * *